United States Patent
Hansen et al.

[15] 3,699,238
[45] Oct. 17, 1972

[54] FLEXIBLE POWER CABLE
[72] Inventors: Theodore E. Hansen; Floyd A. Wilson, both of Marion, Ind.
[73] Assignee: Anaconda Wire and Cable Company
[22] Filed: Feb. 29, 1972
[21] Appl. No.: 230,364

[52] U.S. Cl. .................................. 174/115, 174/116
[51] Int. Cl. ............................................. H01b 9/00
[58] Field of Search ...... 174/115, 113 R, 113 C, 116, 174/27, 110 AR, 110 N, 131 A

[56] References Cited

UNITED STATES PATENTS

| | | | |
|---|---|---|---|
| 2,286,827 | 6/1942 | Morrison | 174/115 X |
| 2,930,837 | 3/1960 | Thompson | 174/115 |
| 3,644,659 | 2/1972 | Campbell | 174/115 X |
| 3,621,118 | 11/1971 | Bunish | 174/115 |

Primary Examiner—Lewis H. Myers
Assistant Examiner—A. T. Grimley
Attorney—Victor F. Volk

[57] ABSTRACT

A flexible power cable for use on mining machines has a central insulated ground check strand comprising conductor wires that are wound around a stretchable tensile core.

6 Claims, 4 Drawing Figures

PATENTED OCT 17 1972
3,699,238
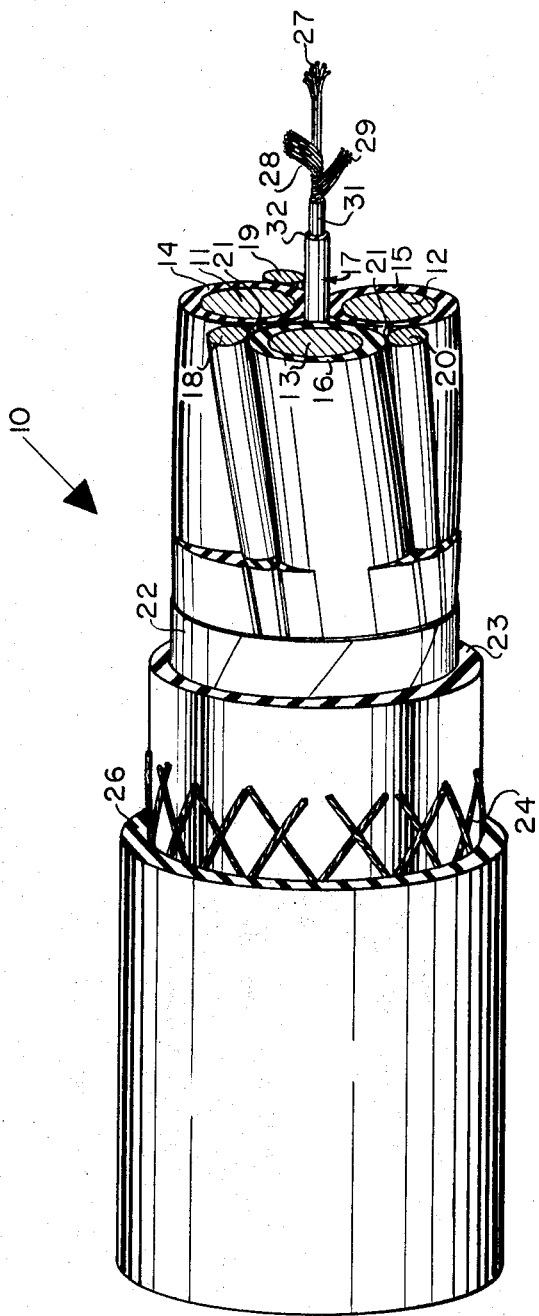

FLEXIBLE POWER CABLE

BACKGROUND OF THE INVENTION

Mining machine cables may be either flat, with the conductors laid parallel to each other, or round, with the conductors wound in a helix, and the equipment with which the cables are used is usually designed to accommodate one or the other cable shape. The present invention relates to round cables, rather than flat. Mining machine cables in common use have comprised three helically-wound insulated power conductors, and three uninsulated grounding conductors cabled in the interstices formed by the insulated conductors. More recently it has been required by government regulations to include an insulated ground check strand for monitoring the integrity of the grounding conductors. This has been laid in one of the interstices in substitution of one of the grounding conductors. Such a cable configuration has, it is now found, a serious disadvantage due to its assymetry, in that unbalanced electrical potentials are induced in the grounding conductors.

SUMMARY

By means of our present invention we propose to avoid structural and electrical imbalance in a three-phase cable having grounding conductors and a ground check strand, while providing that the ground check strand should withstand elongation of the cable in use and outlast the grounding conductors on repeated cable flexing.

Our flexible power cable comprises three insulated power current conductors helically stranded together, three grounding conductors wound in the interstices of the power conductors, and a central insulated ground-check strand. The ground check strand comprises a resiliently stretchable tensile member such, for preferred examples, as polyvinyl chloride extrusions, and pluralities of nylon filaments. A plurality of ground-check wires are wound in a short lay-length around the tensile member. A second plurality of wires may advantageously be wound over these in an opposite direction of lay. A cylindrical wall of polymeric insulation surrounds the wires of the ground-check strand and an abrasion-resistant polymeric jacket covers the cable overall, surrounding the conductors and the grounding strands. Preferably the insulated conductors, and ground-check wires comprise copper.

BRIEF DESCRIPTION OF THE DRAWING

The FIGURE shows a pictorial view of a cable made to our invention, with portions cut away to expose the inside cable elements.

DETAILED DESCRIPTION OF A PREFERRED EMBODIMENT

As illustrative of our invention, we have shown in the FIGURE a 3-conductor, Awg 4/0 cable, for 600 volt service, made in accordance with our teachings and designated generally by the numeral 10. The cable 10 has three power current conductors 11, 12, 13 each made up of 532 tinned copper wires and covered with respective walls 14, 15, 16 of olefinic copolymer insulation 0.080 inch thick. The conductors 11, 12, 13 are helically cabled around a ground check strand 17, hereinafter to be more fully described, and cabled in the interstices of the conductors 11, 12, 13 are three Awg No. 3 grounding conductors 18, 19, 20 each stranded of 259 tinned copper wires. Conventional neoprene cable fillers 21 fill hollows remaining in the interstices and round out the core configuration around which is applied a conventional binder tape 22 which is surrounded with a first extruded neoprene jacket 23, 5/64 inch thick, an open weave nylon seine twine reinforcing web 24, and an overall neoprene jacket 26, 8/64 inch thick. The diameter over the jacket 26 is 2.04 inches.

The ground check element 17 has a tensile core 27 made up of seven 0.025 inch nylon monofilaments laid parallel and compressed to a 0.060 inch diameter by a serving 28 of 20 ends of tinned copper wires of 0.008 inch diameter wound with a left hand lay of ¼ inch pitch and an overlying serving 29 of 20 ends of 0.008 inch diameter tinned copper wires wound at a ¼ inch pitch in a right hand lay. Variations of pitch may be used within the scope of our invention, but the copper wires are required to have a short lay such as a lay not substantially exceeding five times the diameter over the core. The ends may also vary and the minimum lay length will be determined by the number of ends that is chosen. It is not essential, either, that the servings should have opposite directions of lay and both might have either right hand or left hand lays within our inventive concept. A polyester film separator 31, 0.0005 inch thick, is wrapped longitudinally over the wires 29 and an 0.030 inch wall 32 of polypropylene is extruded over the separator 31.

It is well known that when a cable is flexed, the central member of a stranded cable undergoes greater elongation than the members that are wound helically over it. It is for this reason that the ground check strand, which is required to outlast the other cable members has heretofore been wound into one of the outer cable interstices. It has been found, however, that although the ground check strand 17 is centered in the cable 10 it does outlast the grounding conductors 18, 19, 20 in flexing tests and in field service.

To test the need and efficacy of the present improvement a 100 foot length of a cable corresponding to the cable 10 was laid in a figure U with one end connected to a three-phase motor alternator set having a relatively pure sinusoidal output and the other end connected to a balanced 1000 watt per phase load. The grounding connectors were connected to each other at both ends of the cable and grounded at the generator end. Induced voltage in the grounding conductors was measured at the load end and is reported in the TABLE below as specimen A for the condition corresponding to the present construction and as specimen B where one of the grounding conductors was opened to simulate the conditions of the above-mentioned prior art cable having one of the grounding conductors replaced by the ground-check strand.

TABLE

| Phase current | Measured potential, grounding conductors, volts Specimens | |
|---|---|---|
| | A | B |
| 5 | 0 | .003 |
| 7.5 | 0 | .005 |
| 10.0 | 0 | .008 |
| 15.0 | 0 | .011 |

In the illustrative cable 10 we have employed seven nylon monofilaments for the tensile core 27 of our ground-check strand 17. This number, and, indeed the use of nylon is not limiting, the important features being that the core should have enough tensile strength to pull the strand 17 through the extruder during the extrusion of the wall 32, that it should stretch without breaking when the cable 10 is flexed, that it should recover substantially to its original dimensions when the cable 10 is again straightened and, very importantly, that the elongation of the core 27 should be accompanied by a reduction of its diameter so that the pitch of the helix of the wires 28, 29 will be free to lengthen. Upon relaxation it is again advantageous that the diameter of the core 27 should increase to fill the helix formed by the wires 28, 29.

We have found that the necessary requirements for a satisfactory core will be met by a polyvinyl extrusion or, indeed, any polymeric material having a tensile strength exceeding a few hundred pounds per square inch, but preferably over 1000 pounds per square inch, and substantially full recovery from an elongation of 5 percent or more. It is not met, however, by a mere paste or uncured wax or unvulcanized rubber.

We have invented a new and useful power cable of which the foregoing description has been exemplary rather than definitive and for which we desire an award of Letters Patent as defined in the following claims.

We claim:
1. A flexible power cable comprising:
   A. three insulated power current conductors helically stranded together,
   B. three grounding conductors wound in the interstices of said power current conductors,
   C. a central insulated ground-check strand comprising,
      1. a resiliently stretchable tensile member,
      2. a plurality of ground-check wires wound in a short lay-length around said member,
      3. a cylindrical wall of polymeric insulation surrounding said wires, and
   D. an abrasion-resistant polymeric jacket surrounding said insulated conductors and said grounding conductors.
2. The cable of claim 1 wherein said power current conductors, said grounding conductors, and said ground-check wires comprise copper.
3. The cable of claim 1 wherein said ground-check strand comprises a second plurality of ground-check wires wound around said member, said pluralities of wires being wrapped one over the other.
4. The cable of claim 1 wherein said tensile member comprises a polyvinyl chloride extrusion.
5. The cable of claim 1 wherein said tensile member comprises nylon.
6. The cable of claim 5 wherein said tensile member comprises a plurality of filaments.

* * * * *